Aug. 16, 1966    H. L. KRAUSE    3,267,349
LOW SOURCE-VOLTAGE CUTOFF ARRANGEMENT FOR CONVERTERS
Filed Nov. 13, 1962
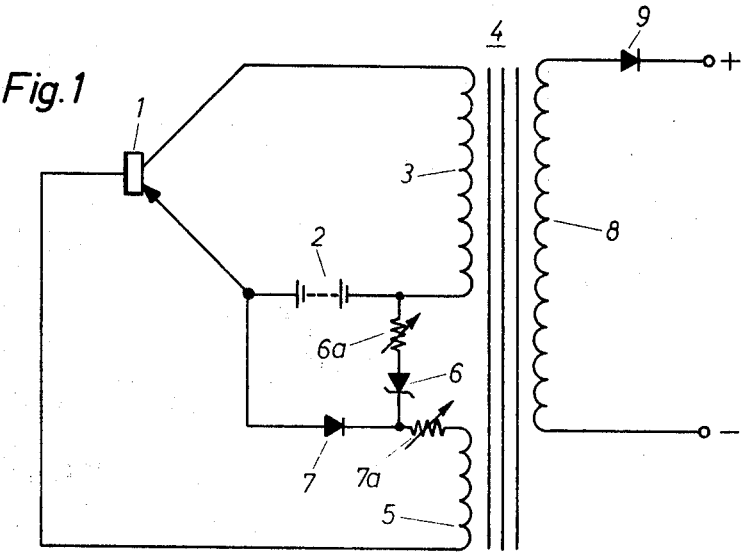
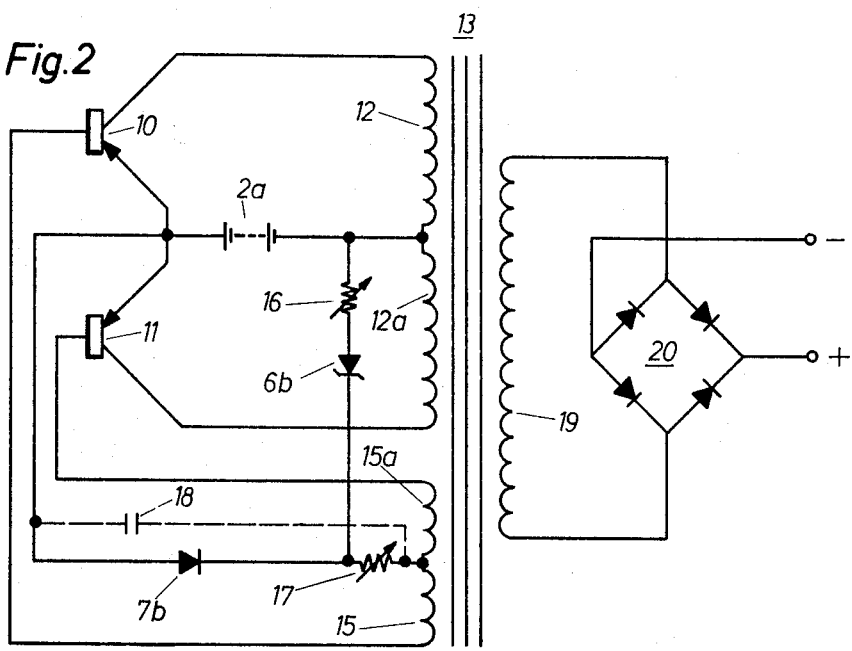
INVENTOR
*Harri L. Krause*
By *McGlew and Toren*
ATTORNEYS ered August 16, 1966

3,267,349
LOW SOURCE-VOLTAGE CUTOFF ARRANGE-
MENT FOR CONVERTERS
Harri L. Krause, Munich, Germany, assignor to Bolkow
Gesellschaft mit beschränkter Haftung, Ottobrunn, near
Munich, Germany
Filed Nov. 13, 1962, Ser. No. 236,857
Claims priority, application Germany, Nov. 21, 1961,
B 64,904
4 Claims. (Cl. 321—2)

This invention pertains, in general, to power converters; and, in particular, to an improved converter wherein, as the voltage level of a D.C. power source decreases to a predetermined level, a novel voltage divider arrangement controlling the base electrode of a transistor oscillator causes blocking of the transistor, thereby preventing the flow of A.C. power through a transformer to a rectifier and load.

Known prior art converters for providing D.C. power to a load are seriously deficient in many respects:

(1) In many arrangements a transistor oscillator would continue supplying low voltage energy to a load even after the oscillator's battery supply voltage had decreased to a low level. One intolerable result, among others, is the premature destruction of loads such as vacuum tubes.

(2) In many arrangements protective devices such as circuit breakers and the like were employed to prevent the destruction of a transistor oscillator circuit when overloads, short circuits or current surges occur in the secondary, or load, circuit. However, these protective devices were always incorporated in the secondary, or load (high voltage) circuit.

(3) Many prior art converter circuit arrangements were highly wasteful and inefficient. Even when the oscillator battery supply voltage had decreased to a low level, energy was still supplied, often needlessly, to the load. Often the result was premature destruction of the load elements (e.g., vacuum tubes operating at low voltage).

(4) Many of the prior art converter circuit arrangements were relatively bulky and weighty. For example, circuit breakers often had to be included in the secondary, or load, side of a transformer-coupled transistor oscillator circuit. Many of the prior art converter circuitry arrangements were ill suited for applications involving missiles equipped with telemetry transmitting apparatus. They were too weighty and too bulky and provided too much power wastefully. In addition, they often caused premature destruction of such delicate electronic components as transmitting and amplifying vacuum tubes.

Accordingly, one object of the present invention is to provide a converter employing a transistor oscillator circuitry which will cease to oscillate when the voltage of the oscillator battery falls below a predetermined value.

Another object of the present invention is to provide a converter including a novel voltage divider arrangement comprising a diode and a zener diode for controlling the potential of the base electrode of a transistor to enable or disable operation according to the voltage level of an oscillator battery supply.

Another object of the present invention is to provide a transistor oscillator coupled through a transformer with a load element and eliminating the need for circuit protective elements in the secondary, or load, side of the transformer.

Another object of the present invention is to provide a transistorized converter which is useful for being carried in a missile.

Another object of the present invention is to provide a converter which is useful in conjunction with solar batteries.

According to one embodiment of the converter of the present invention, there is provided a transistor oscillator which is coupled through a transformer to a load. The oscillator receives its feedback energy through an auxiliary winding on the transformer. Serially connected between the emitter and collector electrodes of the transistor are the primary winding of the transformer and an oscillator battery supply. A voltage divider, comprising a diode and a zener diode, are connected across the oscillator battery supply in series. The diode is connected with the battery supply in its conducting direction while the zener diode is connected in its blocking direction. One side of an auxiliary feedback winding on the transformer is connected between the diode and zener diode and the other side of the feedback winding is connected to the base electrode of the transistor. Coupled in series with the secondary load winding of the transformer is a rectifying means such as a diode. Accordingly, when the voltage of the oscillator battery decreases below a predetermined level, the flow of current in the base circuit of the transistor is diminished because the zener diode connected in its blocking direction now presents a very high impedance and, accordingly, the resistance of the conductively connected diode increases such that the flow of current to the base electrode is diminished thereby blocking the oscillatory action of the transistor.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a schematic diagram of the converter according to one embodiment of the present invention; and FIG. 2 is a schematic diagram of the converter according to another embodiment of the invention.

Shown at FIG. 1 is a half wave D.C. voltage converter. As shown, the transistor 1 has its emitter electrode connected to a positive terminal of a battery 2. The collector electrode of the transistor 1 is connected to one side of the primary winding 3 of the transformer 4. One side of a feedback, or auxiliary, winding 5 of the transformer 4 is connected to the base electrode of the transistor 1. Another side of the primary winding 3 is connected to the negative terminal of the battery 2. The secondary, or load, winding 8 of the transformer 4 is coupled to the output load terminals through the serially connected diode 9.

Instead of the conventional voltage divider employed in the prior art transistor oscillator converters, the diode 7 and the zener diode 6 are employed for voltage dividing purposes in the converter of the present invention. With respect to the positive terminal of the battery 2, the diode 7 is connected thereto in its conducting direction. Also, with respect to the positive terminal of the battery 2, the zener diode 6 is connected in its blocking direction. Thus the diode 7 and the zener diode 6 are serially coupled across the positive and negative terminals of the battery 2. The other side of the feedback winding 5 is serially connected through an adjustable resistor 7a to a point intermediate the diode 7 and the zener diode 6. Similarly, the zener diode 6 is coupled to the negative terminal of the battery 2 through the adjustable resistor 6a. The resistors 6a and 7a, being adjustable, serve to limit the current in the voltage divider circuit and the current flowing through the feedback winding 5 to the base electrode of the transistor. Thus, the variable resistors 6a and 7a adjust the operating point of the transistor 1.

At full voltage of the battery 2, the transistor 1 operates normally; i.e., the required base bias voltage is provided by the voltage divider circuit of the diode 7 and the zener diode 6, according to the arrangement shown at FIG. 1. Thus, the transistor 1 periodically connects current from the battery 2 through the primary winding 3 of the transformer, the periodic oscillation of the transistor 1 being maintained by the feedback winding 5 in the base circuit of the transistor. Accordingly, the varying voltage thus obtained is transformed in the transformer 4, rectified by the diode 9 and then supplied to the load terminals.

However, if the voltage of the battery 2 decreases such that the voltage drop across the zener diode is less than the zener inflection voltage, the zener diode 6 presents a very high circuit impedance. At the same time the forward resistance of the diode 7 is effectively increased so that the voltage dropping therethrough is no longer sufficient to maintain flow of current in the base circuit. Accordingly, the transistor 1 is blocked and the secondary circuit of the converter receives no energy through the transformer 4.

Shown schematically at FIG. 2 is another embodiment of the converter according to the present invention. As shown, two transistors 10 and 11 are connected in a known push-pull arrangement. The emitter electrodes of both transistors are commonly coupled to the positive terminal of a battery 2a. The collector electrode of the transistor 10 is coupled to one side of one primary winding of the transformer 13. The other side of the primary winding 12 is coupled to the negative terminal of the battery 2a. The collector electrode of the transistor 11 is connected to one side of another primary winding 12a of the transformer 13. The other side of the primary winding 12a is coupled to the negative terminal of the battery 2a. The secondary winding 19 of the transformer 13 is connected to a full-wave rectifier comprising the four bridge-connected diodes 20 connected, as shown in FIG. 2. The base electrodes of the transistors 10 and 11 are connected to one side of the feedback windings 15 and 15a, respectively. Serially connected between the positive terminal of the battery 2a and a terminal common to the feedback windings 15 and 15a are the diode 7b and the adjustable resistor 17. Serially coupled between the negative terminal of the battery 2a and a terminal intermediate the diode 7b and the adjustable resistor 17 are the adjustable resistor 16 and the zener diode 6b. The adjustable resistors 16 and 17 serve as limiting resistors for protecting against overloads and, in addition, to set the operating point of the transistor oscillator. Connected in parallel across the adjustable resistor 17 and the diode 7b is the capacitor 18. This connection is shown in dotted line fashion because the capacitor 18 is not indispensable to the operation of the circuit of FIG. 2. The capacitor 18 merely facilitates the starting of oscillations of the transistor oscillator.

The operation of the circuit shown at FIG. 2 is similar to the operation of the circuit of FIG. 1 hereinbefore discussed. At full voltage of the battery 2a, the converter operates in a normal manner; i.e., the transistors 10 and 11 function in push-pull fashion to cause the secondary or load winding 19 of a transformer 13 to induce a voltage due to the alternating current passing through the primary windings 12 and 12a of the transformer. However, as the voltage of the battery 2a decreases to a predetermined level, the resistance of the zener diode 6b increases and becomes highly ohmic. Accordingly, the forward conducting diode 7b is not able to maintain a sufficient current in the base circuit of the transistors 10 and 11. As a consequence the transistors 10 and 11 become blocked and oscillation ceases.

An especially advantageous application of the two converter circuits hereinbefore described is in connection with transmitting systems which are powered by solar batteries. In such systems the electrical energy generated by the solar batteries is first applied to a buffer battery which drives the oscillator. With the circuit arrangement of the present invention there is brought about a disconnection of a telemetry transmitting system (load) when the voltage of the buffer battery falls below a predetermined value. It is only after the buffer battery has been recharged by the solar battery that the transmitting system again becomes operative. Accordingly, the transmitting system supplied by the converter of the present invention will only operate at the correct voltage level. Accordingly, a solar battery (not shown in the drawing figures) may be suitably connected, in a known manner, with the batteries 2, FIG. 1, and 2a, FIG. 2.

While specific embodiments of the invention have been shown and described in detail to illustrate the application of the inventive principles, it will be understood that the invention may be embodied otherwise without departing from such principles.

What is claimed is:

1. A converter for a load comprising: a transformer including a primary winding, a secondary winding connected with the load and a feedback winding; a transistor including an emitter, a collector and a base; a battery including a positive terminal and a negative terminal; a diode and a zener diode connected in a series circuit across said battery terminals, said diode and zener diode being connected in their forward conducting and reverse conducting directions, respectively, relative to said battery terminals; first conductor means connecting said collector to one end of said primary winding; second conductor means connecting said negative terminal to the other end of said primary winding; third conductor means connecting said positive terminal to said emitter; one end of said feedback winding connected to said base and the other end of said feedback winding connected at a point between said series connected diode and zener diode.

2. A converter, according to claim 1, wherein said zener diode is conductive in its reverse conducting direction when the potential of said battery is above a predetermined voltage level and substantialy nonconductive when the potential of said battery is below a predetermined voltage level, whereby the impedance of the forward conducting diode after nonconduction of said zener diode prevents sufficient current flow from said battery to said base, thereby preventing passage of current between said emitter and collector.

3. In a transistor oscillator circuit wherein current from a D.C. voltage source flows in the emitter-collector circuit to an output circuit in accordance with a source of feedback voltage derived from said output circuit and applied to the base of the transistor, the improvement comprising a diode and a breakdown diode connected in series across the voltage source in forward and reverse conduction directions, respectively, said feedback voltage source being applied between said base and a point intermediate said diode and breakdown diode, said breakdown diode becoming nonconductive in the reverse conduction direction when said voltage of said D.C. source drops to a predetermined level whereby current flow in the emitter-collector circuit ceases.

4. In combination with a D.C. voltage source for passing current between first and second electrodes of a semiconductor, including a control electrode, to an output circuit, circuit means responsive to a predetermined decrease of the voltage of said source for interrupting the passage of current between the first and second electrodes, said circuit means comprising a diode and a zener diode connected in series across the source, the control electrode being coupled at a point intermediate said diode and zener diode, said zener diode being conductive to provide flow of control current to said control electrode, only above a predetermined voltage of said source.

References Cited by the Examiner

UNITED STATES PATENTS

| | | | |
|---|---|---|---|
| 2,948,841 | 8/1960 | Locanthi et al. | 321—2 |
| 2,998,577 | 8/1961 | Shern | 321—2 |
| 3,015,771 | 1/1962 | Mesenhimer | 321—5 |
| 3,159,799 | 12/1964 | Cooper | 321—2 |

FOREIGN PATENTS

| | | | |
|---|---|---|---|
| 3,168,714 | 2/1965 | Bruijning | 321—2 X |
| 1,308,092 | 9/1962 | France. | |

JOHN F. COUCH, *Primary Examiner.*

LLOYD McCOLLUM, MILTON O. HIRSHFIELD,
*Examiners.*

G. J. BUDOCK, J. C. SQUILLARO, W. H. BEHA,
*Assistant Examiners.*